United States Patent Office 3,523,078
Patented Aug. 4, 1970

3,523,078
ANTIFRICTION MATERIALS
Vasily Vladimirovich Korshak, Grigory Lvovich Slonimsky, Svetlana Vasilievna Vinogradova, Irina Alexandrovna Gribova, Alexandr Petrovich Krasnov, Anna Nikolaevna Chumaevskaya, Petr Maximilianovich Valetsky, Sergei Nikolaevich Salazkin, Anri Alexandrovich Askadsky, and Anatoly Nikolaevich Baskakov, Moscow, U.S.S.R., assignors to Institut Elementoorganicheskikh, Moscow, U.S.S.R.
No Drawing. Filed Dec. 8, 1967, Ser. No. 688,978
Int. Cl. C10m 7/06, 7/24, 7/34
U.S. Cl. 252—12                                                8 Claims

ABSTRACT OF THE DISCLOSURE

An antifriction plastic material comprising a polyarylate resin selected from the group consisting of isophthalic acid-phenolphthalein resin and terephthalic acid-2,2'-bis(3 - methyl - 4 - oxiphenyl) propane resin having fibrillar structure, and powdered molybdenum disulfide and metal powders as fillers.

---

The present invention relates to antifriction materials in the form of plastic.

The antifriction material is intended for use in manufacturing such articles as cages of rolling friction bearings and bushes of sliding friction bearings used in dry friction units by way of pressing or pressure casting.

These are known in the art as antifriction materials based on polyamides, polyurethanes, epoxide resins, silicone resins and fillers such as graphite, molybdenum disulphide, etc. (cf. French Pats. No. 1,157,600, 1958; No. 1,183,959, 1959; and U.S. Pat. No. 2,849,415, 1958; "Chemical Engineering," 1962, 69, No. 26, 48).

A disadvantage of the known antifriction materials is their fragility which impedes their machining and makes it difficult to obtain from them articles of compound section (e.g., cages of instrument ball bearings).

To manufacture articles of compound section from the above-mentioned antifriction materials, the latter have to be reinforced with fibrous fillers, glass microcylinders, perforated metal sheets, etc., which have the effect of diminishing their antifriction characteristics.

It is an object of the present invention to provide an antifriction material with a high strength and good antifriction characteristics, which will permit articles of compound section to be obtained therefrom without the need for preliminary reinforcement thereof.

According to this and other objects, the invention comprises an antifriction material containing a polyarylated resin of a fibrillar structure, and powdered molybdenum disulphide as a filler.

It is recommended that metallic powders be incorporated in the filler content, for the purpose of increasing the heat and electric conductivity of the material, and improving its forming ability, as well as increasing its strength and wear resistance.

In the antifriction material, there can be used together with the polyarylated resin of a fibrillar structure, polymers of a globular structure.

This brings about an improvement in the friction characteristics, reducing the related coefficient of friction and extending the temperature limits of the workability of the material.

It is preferred to use an antifriction material in which the ratio of the polyarylated resin of a fibrillar structure to the polymers of a globular structure is 90–50:10–50, in weight percent.

It is also preferred to use an antifriction material which consists of 10 to 30 weight percent combined polymers and 90–70 weight percent of filler.

The proposed antifriction material is prepared in the following way.

The components of the antifriction material, i.e. the polyarylated resin of a fibrillar structure and a filler in the form of powdered molybdenum disulphide of an appropriate grinding fineness (dispersity) are subjected to mixing until a complete homogenization. The composition obtained is then pressed.

In cases where metallic powders are incorporated in the filler, and in case the antifriction material comprises polymers of a globular structure in addition to the polyarylated resin of a fibrillar structure, the composition of the antifriction material is prepared in a manner similar to that described hereinabove.

For a better understanding of the present invention, the following examples of the preparation of antifriction materials are described hereinbelow.

EXAMPLE 1

Into a vibrating mill were charged 7.5 g. of the polyarylate of a fibrillar structure based on isophthalic acid and phenolphthalein, 15 g. of molybdenum disulphide powder with a particle size ranging from $1\mu$ to $15\mu$, and 7.5 g. of metallic copper, which were then all mixed for 3 to 5 minutes.

The composition obtained was subjected to pressing at 300–320° C. and a specific pressure of 1,000–1,200 kg./cm.$^2$.

The antifriction material has the following physical and mechanical characteristics:

Brinell hardness $H_B$—20 kg./mm.$^2$

Impact strength—$6\frac{kg \cdot cm.}{cm.^2}$

Coefficient of friction ($V=2$ m./sec., $p=2$ kg./cm.$^2$)—0.08–0.1

Intensity of linear wear ($V=2$ m./sec., $p=2$ kg./cm.$^2$)—$2.5 \cdot 10^{-10}$ Maximum permissible working temperature—160° C.

EXAMPLE 2

Into the vibrating mill were charged 7.5 g. of the polyarylate of a fibrillar structure based on isophthalic acid and phenolphthalein, 15 g. of molybdenum disulphide powder with a particle size ranging from $1\mu$ to $15\mu$ and 7.5 g. of metallic silver powder. The mixing and processing conditions were similar to those in Example 1.

The antifriction material has the following physical and mechanical characteristics:

Brinell hardness $H_B$—19 kg./mm.$^2$

Impact strength—$6\frac{kg \cdot cm.}{cm.^2}$

Coefficient of friction ($V=2$ m./sec., $p=2$ kg./cm.$^2$)—0.08

Intensity of linear wear ($V=2$ m./sec., $p=2$ kg./cm.$^2$)—$2.5 \cdot 10^{-10}$ Maximum permissible working temperature—160° C.

EXAMPLE 3

Into the vibrating mill were charged 7.5 g. of the polyarylate of a fibrillar structure based on terephthalic acid and 2,2'-bis(3-methyl-4-oxiphenyl) propane, 15 g. of molybdenum disulphide powder, and 7.5 g. of metallic copper powder. The conditions of mixing were similar to those in Example 1.

The composition obtained was subjected to pressing at 270–280° C. and a specific pressure of 1,000 kg./cm.$^2$.

The antifriction material has the following physical and mechanical characteristics:

Brinell hardness $H_B$—18 kg./mm.$^2$

Impact strength—$5\frac{kg \cdot cm.}{cm.^2}$

Coefficient of friction ($V=2$ m./sec., $p=2$ kg./cm.$^2$)— 0.09

Intensity of linear wear ($V=2$ m./sec., $p=2$ kg./cm.$^2$)— $2.0 \cdot 10^{-10}$ Maximum permissible working temperature—120° C.

EXAMPLE 4

Into the vibrating mill were charged 3.75 g. of the polyarylate of a fibrillar structure and 3.75 g. of the polyarylate of a globular structure based on isophthalic acid and phenolphthalein, 15 g. of molybdenum disulphide powder and 7.5 g. of metallic silver powder.

The mixing and processing conditions were similar to those in Example 1.

The antifriction material has the following physical and mechanical characteristics:

Brinell hardness $H_B$—23 kg./mm.$^2$

Impact strength—$4.5\frac{kg \cdot cm.}{cm.^2}$

Coefficient of friction ($V=2$ m./sec., $p=2$ kg./cm.$^2$)— 0.08–0.1

Intensity of linear wear ($V=2$ m./sec., $p=2$ kg./cm.$^2$)— $3.0 \cdot 10^{-10}$ Maximum permissible working temperature—180° C.

EXAMPLE 5

Into the vibrating mill were charged 3.75 g. of the polyarylate of a fibrillar structure based on isophthalic acid and phenolphthalein, 3.75 g. of the polyarylate of a globular structure based on terephthalic acid and phenolphthalein, 15 g. of molybdenum disulphide powder, and 7.5 g. of metallic copper powder.

The mixing conditions were similar to those in Example 1.

The composition obtained was subjected to pressing at 320–350° C. and a specific pressure of 1,000–1,200 kg./cm.$^2$.

The antifriction material has the following physical and mechanical characteristics:

Brinell hardness $H_B$—23 kg./mm.$^2$

Impact strength—$4.5\frac{kg \cdot cm.}{cm.^2}$

Coefficient of friction ($V=2$ m./sec., $p=2$ kg./cm.$^2$)— 0.08–0.1

Intensity of linear wear ($V=2$ m./sec., $p=2$ kg./cm.$^2$)— $3.0 \cdot 10^{-10}$ Maximum permissible working temperature—190° C.

EXAMPLE 6

Into the vibrating mill were charged 3.75 g. of the polyarylated resin of a fibrillar structure based on isophthalic acid and phenolphthalein, 3.75 g. of the polyamide of a globular structure based on isophthalic acid and m-phenylene diamine, 15 g. of molybdenum disulphide powder, and 7.5 g. of metallic copper powder. The mixing conditions were similar to those in Example 1.

The obtained composition was subjected to pressing at 320–340° C. and a specific pressure of 1,000–1,200 kg./cm.$^2$.

The antifriction material has the following physical and mechanical characteristics:

Brinell hardness $H_B$—18 kg./mm.$^2$

Impact strength—$4\frac{kg \cdot cm.}{cm.^2}$

Coefficient of friction ($V=2$ m./sec., $p=2$ kg./cm.$^2$)— 0.08

Intensity of linear wear ($V=2$ m./sec., $p=2$ kg./cm.$^2$)— $3.0 \cdot 10^{-10}$ Maximum permissible working temperature—180° C.

Thus the obtained antifriction material possesses a high strength and good antifriction characteristics.

Although the present invention has been described with reference to an exemplary embodiment thereof, various alterations and modifications can be made without departing from the spirit and scope of the invention, as those skilled in the art may easily understand. These alterations and modifications are to be considered as falling within the essence and scope of the invention, as specified in the appended claims.

We claim:

1. A plastic antifriction material which consists of polyarylate resin selected from the group consisting of isophthalic acid-phenolphthalein resin and terephthalic acid-2,2'-bis(3-methyl-4-oxiphenyl) propane resin having a fibrillar structure and a filler consisting of powdered molybdenum disulfide and a metal powder.

2. A plastic antifriction material according to claim 1, constituted of 10–30 weight percent of said polyarylate resin having a fibrillar structure, 70–75 weight percent of powdered molybdenum disulfide, and 20–15 weight percent of said metal powder.

3. A plastic antifriction material which comprises a polyarylate resin selected from the group consisting of isophthalic acid-phenolphthalein resin and terephthalic acid-2,2'-bis(3-methyl-4-oxiphenyl) propane resin having a fibrillar structure, polymers having a globular structure selected from isophthalic acid-phenolphthalein resin, terephthalic acid-phenolphthalein resin, and isophthalic acid-meta phenylene diamine resin and a filler consisting of powdered molybdenum disulfide and a metal powder.

4. A plastic antifriction material according to claim 3, constituted of 10–20 weight percent of said polyarylate resin having a fibrillar structure, 10–5 weight percent of said polymer having a globular structure, 60 weight percent of powdered molybdenum disulfide, and 20–15 weight percent of said metal powder.

5. A plastic antifriction material according to claim 1 wherein the metal powder is copper or silver.

6. A plastic antifriction material according to claim 2 wherein the metal powder is copper or silver.

7. A plastic antifriction material according to claim 3 wherein the metal powder is copper or silver.

8. A plastic antifriction material according to claim 4 wherein the metal powder is copper or silver.

References Cited

UNITED STATES PATENTS 3,014,865   12/1961   Seniff et al. _____ 252—12

DANIEL E. WYMAN, Primary Examiner

I. VAUGHN, Assistant Examiner

UNITED STATES PATENT OFFICE
CERTIFICATE OF CORRECTION

Patent No. 3,523,078      Dated August 4, 1970

Inventor(s) Vasily Vladimirovich Korshak et al.

It is certified that error appears in the above-identified patent and that said Letters Patent are hereby corrected as shown below:

In the heading to the printed specification, lines 5 and 6, "Anna Nikolaevna Chumaevskaya" should read -- Alla Nikolaevna Chumaevskaya --.

Signed and sealed this 25th day of May 1971.

(SEAL)
Attest:

EDWARD M. FLETCHER, JR.             WILLIAM E. SCHUYLER, JR.
Attesting Officer                     Commissioner of Patents